Figure 1:
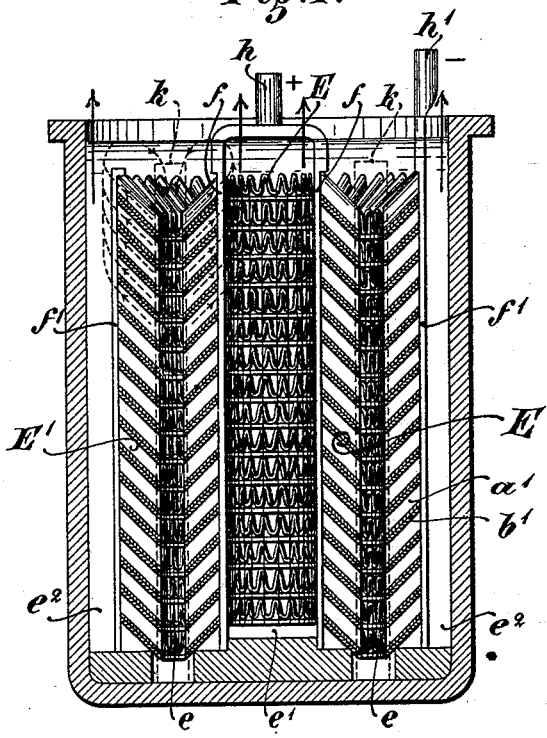

No. 623,104. Patented Apr. 11, 1899.
H. PIEPER, FILS.
ELECTRODE FOR ELECTRIC ACCUMULATORS.
(Application filed Dec. 28, 1897.)

(No Model.) 2 Sheets—Sheet 1.

Witnesses:

Inventor
Henri Pieper fils

No. 623,104. Patented Apr. 11, 1899.
H. PIEPER, FILS.
ELECTRODE FOR ELECTRIC ACCUMULATORS.
(Application filed Dec. 28, 1897.)

(No Model.) 2 Sheets—Sheet 2.

Witnesses:

Inventor:

UNITED STATES PATENT OFFICE.

HENRI PIEPER, FILS, OF LIEGE, BELGIUM.

ELECTRODE FOR ELECTRIC ACCUMULATORS.

SPECIFICATION forming part of Letters Patent No. 623,104, dated April 11, 1899.

Application filed December 28, 1897. Serial No. 663,824. (No model.)

*To all whom it may concern:*

Be it known that I, HENRI PIEPER, Fils, a subject of the King of Belgium, residing at Liege, in the Kingdom of Belgium, have invented new and useful Electrodes for Electric Accumulators, (for which I have obtained a patent in Belgium, No. 128,733, dated June 1, 1897,) of which the following is a specification.

This invention relates to electrodes for secondary batteries or electric accumulators, and has for its object to render the action or working of said electrodes as uniform as possible, and so through the agency of the electrodes themselves. To obtain this, the present invention essentially consists in so constructing the electrode that it has imparted to it the faculties of uniformly distributing the liquid through its body, of continuously renewing the liquid at all points, and of maintaining a uniform density throughout the liquid. This is brought about in a very efficient manner by building up the electrode with radially-corrugated plates having the shape of hollow truncated cones open at the top and bottom and plain or uncorrugated plates of like shape in such a manner that the corrugated plates alternate with uncorrugated plates, or, in other terms, that there is an uncorrugated plate interposed between each two neighboring corrugated plates. By this construction numerous channels are formed which extend through the entire thickness of the electrode in an inclined direction, the walls of said channels constituting the active or working surface of the electrode. Thus a structure is created which is penetrated by the liquid as uniformly as possible in all its parts. By the inclination of said channels the gas-bubbles evolved at the surface thereof are caused to pass upward, and in taking this course said bubbles, on the one hand, push liquid from the channels into the liquid-space adjacent to the exit side of the electrode and, on the other hand, exert a sucking action upon the liquid filling the space adjacent to the other side of the electrode. This double action results in producing and continuously maintaining a quick circulation in the entire bulk of liquid, whereby a continuous and rapid equalization of the density of differences of the liquid and an efficacious renewal of the liquid in all parts of the electrode is brought about. The electrode may be said to pump the liquid through it.

The described improvement is the more important, as it necessarily gives the electrode an enormous working surface without in the least augmenting its weight.

The invention may be used with the positive electrode alone or with both the positive and the negative electrodes. I prefer to build up both the electrodes in the manner described.

In the annexed drawings I have represented an example of how to carry out my present invention.

Figure 3:
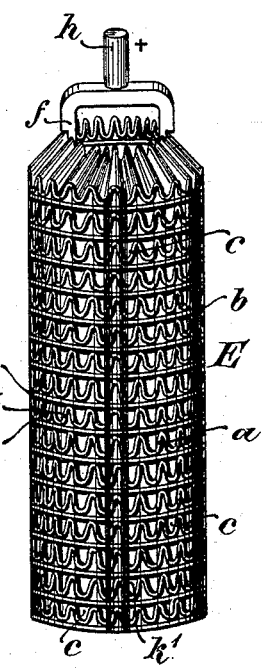
Figure 2:
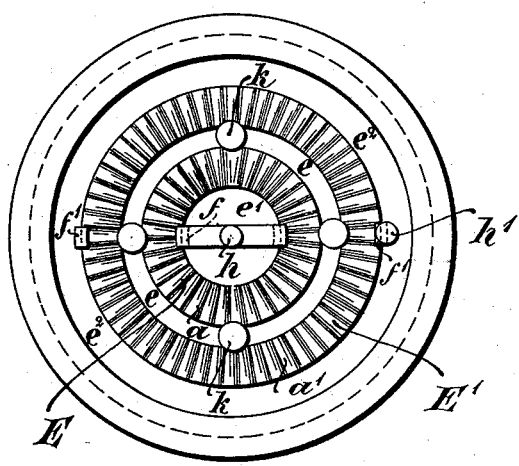
Figure 4:
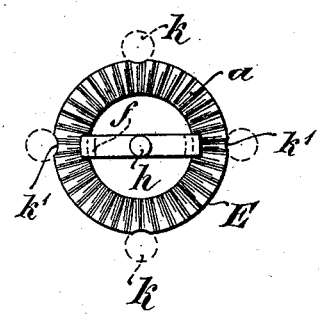
Figure 5:
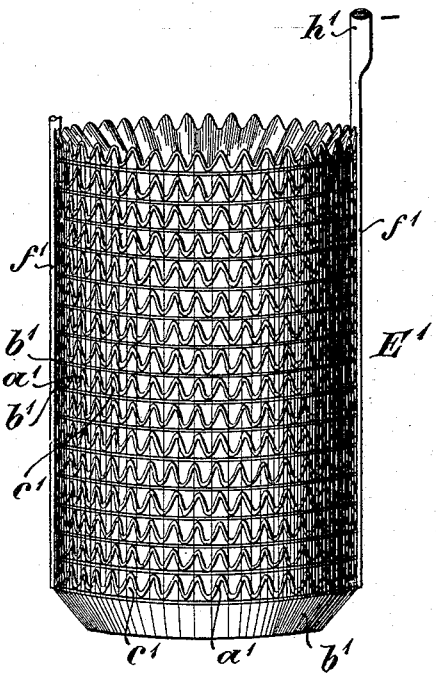
Figure 6:
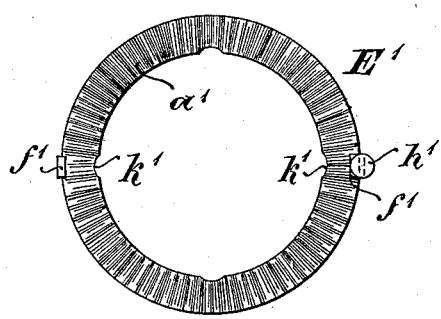

Figure 1 is a vertical central section through an accumulator both electrodes of which are built up with plates formed as hollow truncated cones, the positive electrode being encompassed by the negative one. Fig. 2 is the plan of this accumulator. Fig. 3 is an elevation of the positive electrode, and Fig. 4 the plan of same. Fig. 5 is an elevation of the negative electrode, and Fig. 6 the plan of same.

According to the direction of the channels required for the purpose of the present invention the positive electrode E, Figs. 1 and 2, is built up with plates formed as hollow truncated cones, the bases of which are directed downward—that is, the plates are piled up by placing one upon the other, so that the channels formed extend from the space between the two coöperating electrodes upward to the inner space of the electrode.

$a$ are the corrugated plates, the corrugations of which are arranged radially.

$b$ are the even-surface—*i. e.*, the non-corrugated—plates, and $c$ the channels.

$e$ is the space between the two electrodes or intermediary space, and $e'$ the inner space.

The negative electrode E', encircling the positive one, is built up with hollow truncated cones directed with their base upward—that is to say, the negative electrode is built up by placing the plates one into the other, so that the channels extend from the intermediary space upward to the outer side of the electrode.

$a'$ are the corrugated plates with the corrugations $x'$ arranged radially, $b'$ the even-surface plates, and $c'$ the channels.

$e^2$ is the space surrounding the outside of the negative electrode or outer space.

The circulation of the liquid which takes place is indicated by dotted arrows. As shown, the circulation produced by the positive electrode is from the intermediary space $e$, through the channels $c$, into the inner space $e'$, ascending in the latter, and back to the intermediary space over the top of the electrode. The circulation created by the negative electrode is from the intermediary space $e$, through the channels $c'$, into the outer space $e^2$, ascending in the latter, and back to the intermediary space over the top of the electrode. The exit of the gases is indicated by plain arrows.

In the drawings the positive electrode E is the encompassed one; but the arrangement may be made the reverse, the positive electrode being arranged to encircle the negative one. In this case the positive electrode must be built up with plates such as $a'$ and $b'$ and the negative electrode with plates such as $a$ and $b$. Obviously the negative electrode may be plain or constructed in a different way.

The plates may be prepared according to Planté's method or covered or coated or otherwise provided with a layer of active material.

When built up, the plates should be put in metallic communication with each other by soldering thereon lead strips. In the drawings, $f$ indicates the lead strips connecting the positive plates, and $f'$ the lead strips connecting the negative plates. $h$ is the terminal of the positive electrode, and $h'$ the terminal of the negative electrode.

To insure the proper distance between the electrodes, glass tubes or rods $k$ may be vertically inserted into the intermediary space, the edges of the plates being provided with grooves $k'$, facing each other, for the reception of said tubes.

What I claim, and desire to secure by Letters Patent of the United States, is—

1. In an electrode for use in electric accumulators, the combination of radially-corrugated plates having the shape of hollow truncated cones open at the bottom and top, with plain plates of like description, the corrugated plates alternating with the plain plates and forming inclined open channels on both sides of the latter, and all of the plates being electrically connected to each other, substantially as and for the purposes specified.

2. The combination, in electric accumulators, of an inclosed electrode built up with radially-corrugated plates having the shape of hollow truncated cones open at the top and bottom and alternating with plain plates of same description, with an inclosing electrode built up with radially-corrugated plates having the shape of hollow truncated cones open at the top and bottom and alternating with plain plates of like description, the electrodes being built up in such relation to each other that the open channels formed in each electrode by the corrugated plates are inclined in the one electrode in the opposite direction to those in the other electrode, substantially as and for the purposes hereinbefore set forth.

In testimony whereof I have hereunto set my hand in the presence of two subscribing witnesses.

HENRI PIEPER, Fils.

Witnesses:
L. PAUCHEMOCK,
M. FRIED. HOUNNY.